United States Patent [19]

Schabert et al.

[11] 4,096,881
[45] Jun. 27, 1978

[54] NUCLEAR-REACTOR STEAM-GENERATOR SHUT-OFF VALVE

[75] Inventors: Hans-Peter Schabert; Erwin Laurer, both of Erlangen, Germany

[73] Assignee: Kraftwerk Union Aktiengesellschaft, Mulheim an der Ruhr, Germany

[21] Appl. No.: 590,674

[22] Filed: Jun. 26, 1975

[30] Foreign Application Priority Data

Sep. 26, 1974 Germany .................. 2446044

[51] Int. Cl. .................................. F16k 31/122
[52] U.S. Cl. ............................. 137/492; 251/25; 251/62
[58] Field of Search ............... 91/170, 411 R, 28; 251/62, 63, 634, 25, 31, 297; 92/62, 65, 27; 137/492

[56] References Cited

U.S. PATENT DOCUMENTS

| 451,846 | 5/1891 | Bachman | 92/62 |
|---|---|---|---|
| 1,181,111 | 5/1916 | Carter | 92/65 |
| 2,333,274 | 11/1943 | Scannell | 92/62 |
| 2,728,547 | 12/1955 | Crookston et al. | 251/31 |
| 3,149,537 | 9/1964 | Fink | 92/62 |
| 3,155,365 | 11/1964 | Hartung et al. | 251/31 |
| 3,187,637 | 6/1965 | Edmund | 92/62 |
| 3,225,544 | 12/1965 | Lemley | 91/28 |
| 3,410,518 | 11/1968 | Carsten | 251/31 |
| 3,469,503 | 9/1969 | Adler et al. | 92/62 |
| 3,597,016 | 8/1971 | Gachot et al. | 92/27 |

Primary Examiner—Martin P. Schwadron
Assistant Examiner—G. L. Walton
Attorney, Agent, or Firm—Kenyon & Kenyon, Reilly, Carr & Chapin

[57] ABSTRACT

In a nuclear reactor installation, a live-steam line leading from each steam generator through the containment, is equipped with a fast-acting valve. If the pressure in the generator rises the valve operates as a safety valve and releases up to one-half of the aperture cross section of the valve, so that there is no danger of damage to the steam generators. According to the invention, the valve is operated for this purpose by two pistons by means of steam. The invention is of interest particularly for light-water reactors, e.g., pressurized-water reactors.

9 Claims, 4 Drawing Figures

NUCLEAR-REACTOR STEAM-GENERATOR SHUT-OFF VALVE

BACKGROUND OF THE INVENTION

The U.S. Schabert et al application Ser. No. 590,673, filed June 26, 1975, is concerned with a nuclear reactor installation with a containment and a steam generator's live-steam line leading from the containment's inside to the outside, which comprises a fast-acting valve with an aperture cross section corresponding to the cross section of the live-steam line and with a valve disk which is closed in case of a leak in the live-steam line under the action of a pressure medium. With the valve disk there is associated an opening mechanism which acts in dependence on the pressure and opens at a pressure higher than the operating pressure of the live-steam line, but releases at most one-half the aperture cross section of the valve and line. This results in the advantage that no undesirably high outflow rates with secondary damage to the generator's possibly sensitive heat-exchanger tubes can occur if the fast-acting valve in its operating mode as a safety valve, releases an outlet for the steam and the flow resistance is much lower than during normal operation, due to a break in the live-steam line.

SUMMARY OF THE INVENTION

It is an object of the invention to improve nuclear reactor installations according to that invention with the goal to reduce the expenditure of technical means for operating the valve. According to the invention, this has been achieved successfully by the provision that for the purpose of operating the valve, two pistons can be connected with the part of the live-steam line located ahead of the valve, and which are associated with definite partial aperture cross sections of the valve.

By using steam as the operating means, one can achieve independence of auxiliary power, which can be difficult and expensive to make available, particularly for security in the event of an accident. The simplicity of operation by steam makes possible, nevertheless, by means of two pistons which are associated with definite aperture cross sections of the valve, a valve opening or aperture adequate for all operational cases. Thus, one can maintain an opening at only a small fraction of the aperture cross section in the case of a break of the live-steam line with a low flow resistance, while for a higher flow resistance, safe operation of succeeding safety valves or blow-off valves is assured by a larger fraction of the aperture cross section.

The two pistons are preferably arranged in a common cylinder. In this connection, it is advantageous that only one of the pistons is rigidly connected with the valve disk, while the other one is coupled with the valve disk only for part of the valve stroke. A particularly space-saving design is obtained thereby, as will be explained in further detail later with reference to an embodiment example of the invention.

In one preferred embodiment of the invention, the area of the one piston is larger than the area of the other piston but smaller than the sum of this area and of the valve disk acted upon in the same direction, including the stem of the latter. Here, the pistons can be made to act against each other alternatingly, so that the desired control of the aperture cross sections is obtained in dependence on different pressures.

It can furthermore be advantageous that the valve position with the larger aperture cross section has a disengageable pawl. This pawl forms, on the one hand a stop which assures that a given aperture cross section is maintained if the valve is operated by means of steam. On the other hand, the maximum opening desired in operation can be set by disengaging the pawl.

Another embodiment of the invention is distinguished by the feature that at least one of the pistons can be connected to a compressed-air source for closing the valve completely. With the compressed air, operation can be ensured, using the pistons serving for the operation in the normal case, also if there is no more steam after the reactor is shut down. The design of the compressed air supply can be simple, as it does not matter in the event of an accident whether the pressureless steam line is temporarily not completely shut off. However, also other means, e.g., springs or weights, can be employed for shutting off the new valve without steam operation.

BRIEF DESCRIPTION OF THE DRAWINGS

An example of the invention is shown by the accompanying drawings, in which.

DETAILED DESCRIPTION OF THE INVENTION

Figure 1:
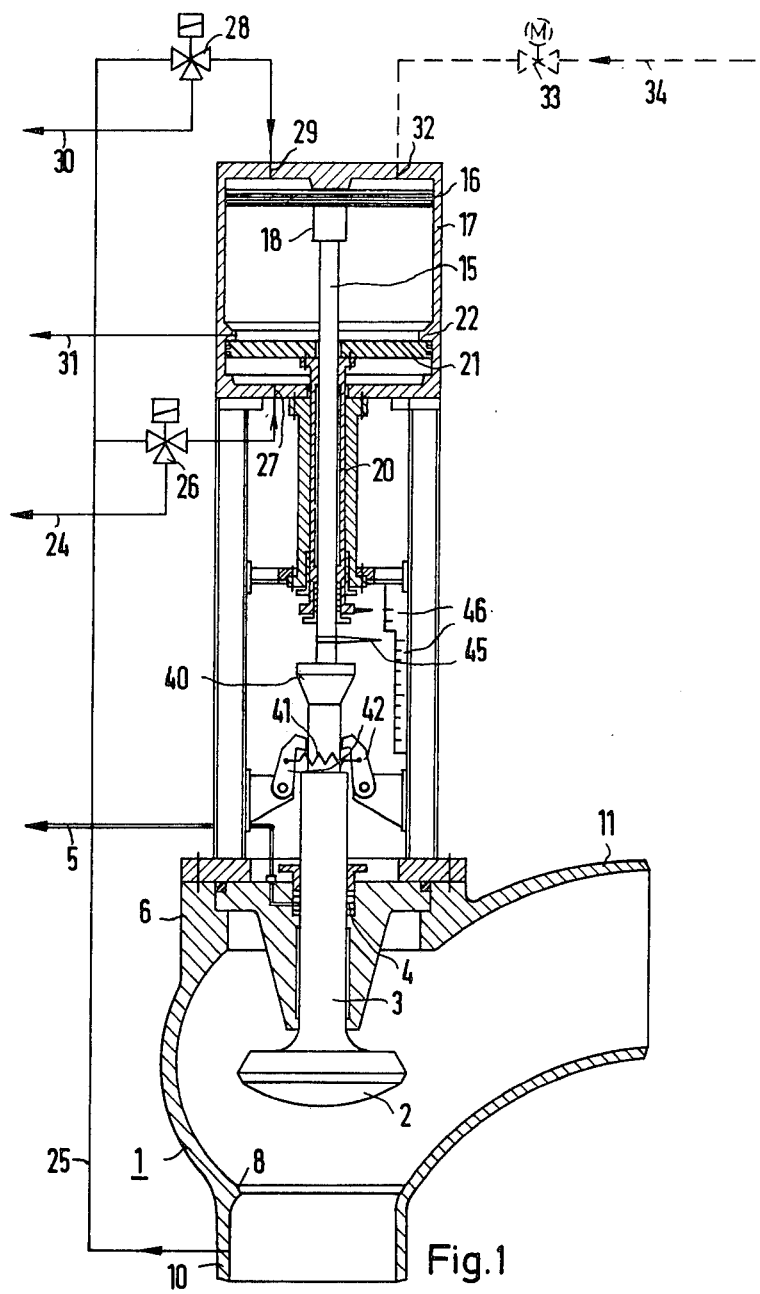
FIG. 1 is a vertical section through the new valve.

To explain the invention in further detail, an example of an embodiment will be described in the following with reference to the drawing. For the sake of clarity, only the valve with its drive mechanism is shown as essential for the invention; the valve can be used in the live steam line close to a steam generator within the usual containment, or in the line on the outside of the containment.

The valve 1 has a housing 6 with a vertically-movable valve disk 2, whose stem 3 is guided tightly in a stuffing gland 4. The stuffing gland 4 is provided with a suction line 5 so that its tightness can be monitored.

With the valve disk 2, a valve seat 8 is associated, whose aperture diameter of, for instance, 600 mm agrees with the aperture cross section of a live-steam line 10, which can be shut off by the valve, to such an extent that the valve 1 causes no appreciable flow loss. This is important, as the live-steam line 10, coming from a steam generator, leads with the line part 11 behind the valve 1 to a turbine outside of the containment, not shown. The operating pressure of the steam system is, for instance, 70 bar. The stem 3 of the valve disk 2 is connected, via a piston rod 15, with a piston 16 which can slide in a cylinder 17. At the end of the piston rod 15 facing the piston 16, a shoulder 18 is provided as a stop.

A hollow or tubular piston rod 20, with which a piston disk 21 is connected, is mounted concentrically to the piston rod 15. The piston disk 21 forms a ring piston surrounding the piston rod 15. Its piston stroke is limited to about 1/5 of the cylinder length by a stop 22 on the inside of the cylinder 17.

On the side of the valve 1 facing the steam generator, a control line 25 is connected to the live-steam line 10. From the former, a pressure-dependent and controllable 2-3-way valve 26 leads to the underside of the cylinder 17, so that steam admission to the underside of the ring piston 21 is possible via the inlet 27. This takes place when the valve 26 is opened and in pressure-dependent operation, at steam pressure of more than 80 bar in the line 25, while the valve 26 connects the inlet 27 with a blow-down line 24 at steam pressure at the inlet 27, in the range of 0 to 80 bar. The control line 25 is further connected, via a 2-3-way valve 28, of identical or similar design as the valve 26, with the upper side of the cylinder 17. When this valve 28 is opened and in pressure-dependent operation, the inlet 29 and thereby, the upper side of the piston 16 is therefore acted upon by steam at pressures of 0 to 80 bar, while at pressures of more than 88 bar a connection with a blowdown line 30 is established. Between the pistons 16 and 21, the interior of the cylinder 17 is vented via a line 31.

On the upper side of the cylinder 17, a further inlet 32, as indicated by the dashed line, is arranged, which is in connection with a source of compressed air, not shown, via a motor-driven shut-off valve 33 in a control line 34. The pressure of the compressed-air source may be, for instance, 6 bar, as a holding operation is intended by means of the compressed air, only for the case that the line 10 is without pressure.

At the transition to the piston rod 15, the stem 3 of the valve disk 2 is provided with a cone 40, with which pawls 42, pre-loaded by a spring 41, are associated. This permits the valve to function as follows:

In normal operation, the valve 1 is open as shown in FIG. 1. Its aperture cross section corresponds to that of the live-steam line 10. The valves 26 and 28 are closed and not pressure-dependent. The normal operating pressure of 70 bar prevails in the line 10.

Figure 2:
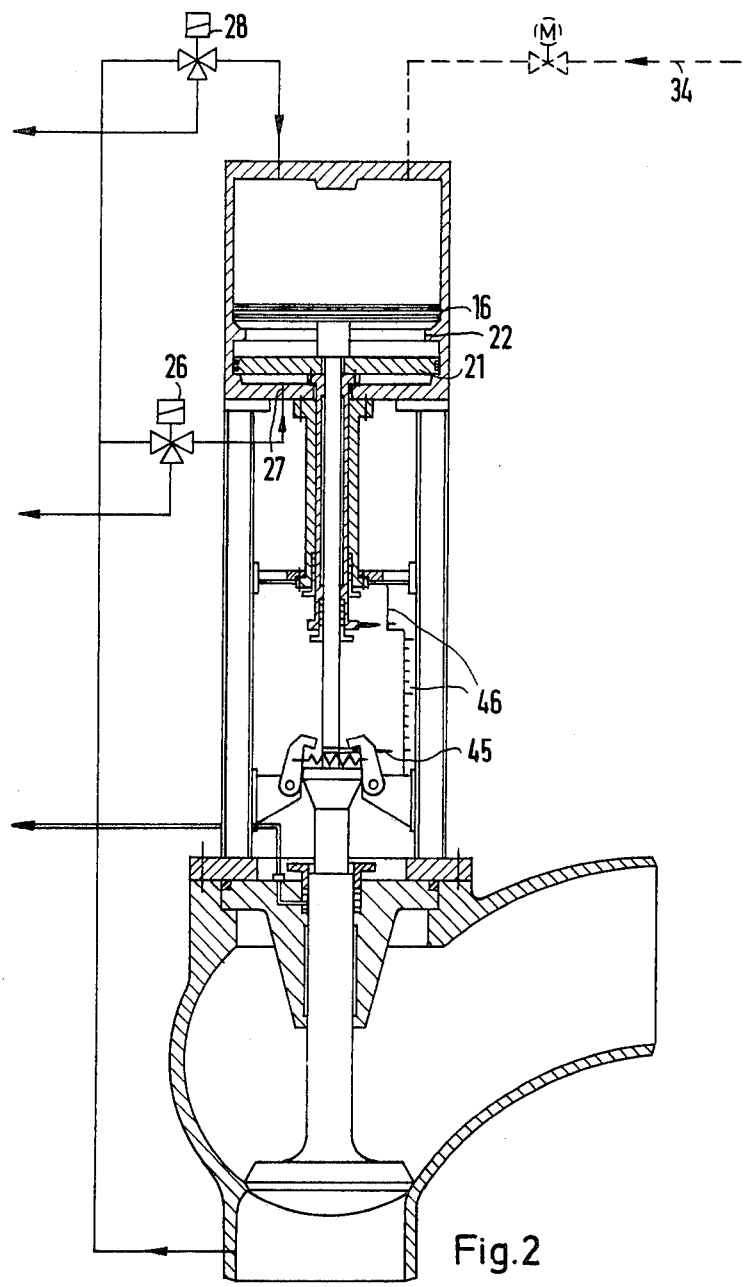
FIGS. 2 to 4 are the same but show various phases in the operation of the valve.
Figure 3:
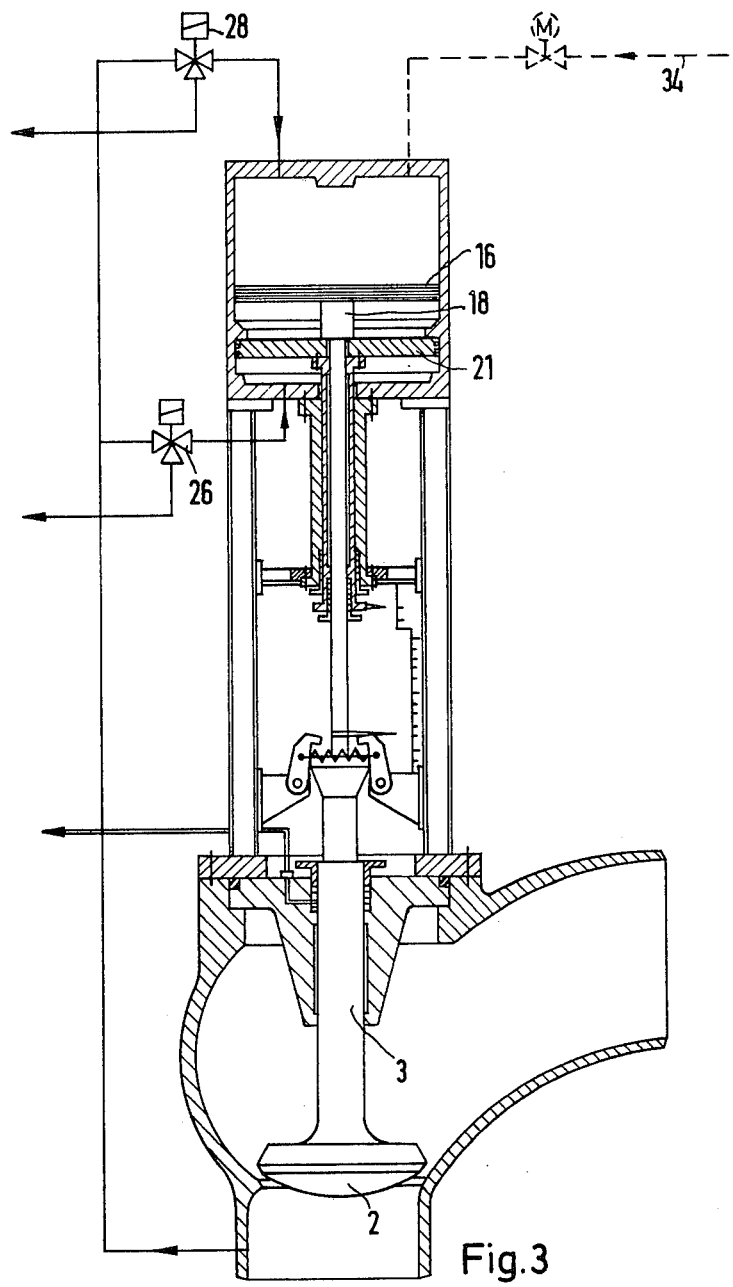

In case of damage in the steam system, particularly a leak in the part 11 of the line, the valves 26 and 28 are acted upon as by magnetic controllers 26a and 28a, respectively, so that they are opened or unlocked and can operate in dependence on pressure. As at that time, the pressure is less than 70 bar because of the leak, the piston 16 is acted upon via the valve 28 and inlet 29. It closes the valve 1, as shown in FIG. 2 the valve 26 connecting the inlet 27 to blow down and the piston area of the piston 16 being greater than that of the valve disk 2. The closed position is indicated on a scale 46 by a pointer 45 attached to the piston rod 15. Should the internal pressure in the line 10 rise after the valve is closed, the ring piston 21 is acted upon by steam via the valve 26 and inlet 27, at a pressure of 80 bar. The ring piston 21 travels up to the stop 22, as the steam pressure force exerted by it and the stem 3 via the steam pressure on its valve disk 2, in the opening direction, is greater than the closing force of the steam pressure on the piston 16. As can be seen from the drawings, the combined piston areas of the ring piston 21 and of the valve disk 2, are greater than the piston area of the piston 16. The valve 1 is hereby opened with a cross section of 15% of the nominal cross section, as is shown in FIG. 3.

Figure 4:
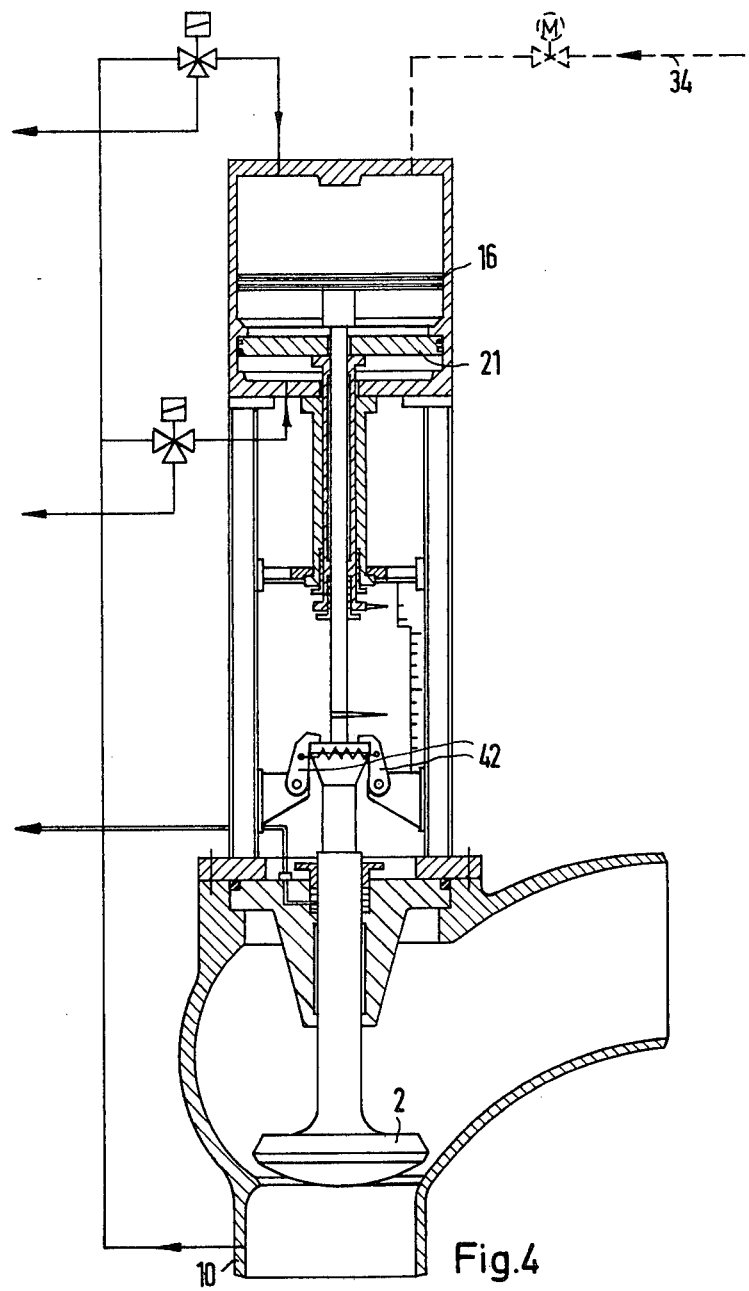

If the pressure in the line 10 continues to rise in spite of the opening because, for instance, the overall flow resistance is still too high, the pressure-dependent valve 28 is switched over at a pressure of 88 bar and connects the inlet 29 to blow-down, and the piston 16 is thereby completely relieved of pressure. The force acting on the stem 3 via steam pressure on its valve disk 2, can therefore open the valve. The pawls 42 prevent here an opening of more than 30%. The position with a partial aperture cross section of 30% is shown in FIG. 4.

With the pressure-dependent control described, which operates without resorting to auxiliary power, the shutting-off of the live-steam line and the pressure-dependent opening are controlled so that undesirably violent outflow from the steam generator, which could cause secondary damage to the steam generator, is prevented.

The completely closed position of the valve, shown in FIG. 1, can also be maintained safely with the compressed air which comes from the line 34 and acts on the piston 16 also, if the steam pressure has practically dropped to zero. By means of the compressed air, the valve 1 can be held closed without the need for special mechanical members which detract from the pressure-dependent control described above.

For opening of the valve disk 2 to the full aperture cross section, which is necessary for normal operation, the pawls 42 are disengaged manually. The valve can then return into the position shown in FIG. 1.

What is claimed is:

1. A fast acting valve for use in the live steam line of a nuclear reactor installation, which steam line leads from a containment to outside thereof, comprising:
   a. a valve housing having a valve seat with an aperture corresponding to the diameter of the live steam line;
   b. a valve disc adapted for reciprocal motion with respect to said valve seat to move from a position where it fully closes said aperture to a position where said aperture is fully open providing within the valve a cross section corresponding to the cross section in the live steam line, said valve disc supported for said reciprocal motion on a valve stem;
   c. a first piston and cylinder arrangement having a piston rigidly coupled to said valve stem, said piston having a range of travel at least equal to the travel of said valve disc between said fully open and fully closed positions;
   d. a second piston and cylinder arrangement with a range of travel between first and second end positions less than the range between said fully opened and fully closed positions coupled to said stem such as to be moved to said first end position when said valve disc is in the fully closed position and such as to permit moving said valve disc and stem from said closed position to a first intermediate position when at its second end position;
   e. means coupled to the inlet side of said valve for supplying the steam pressure therein to said first piston and cylinder arrangement when there is a leak in the steam line to move said piston and move said valve disc from a fully open to a fully closed position and thereby move said second piston to its first end position; and
   f. second means coupled to said inlet and responsive to an excess pressure above normal operating pressure at said inlet to admit steam to said second piston cylinder arrangement to move said piston from said first end position to said second end position thereby opening said valve to said first intermediate position.

2. Apparatus according to claim 1 wherein said first and second pistons are disposed within a common cylinder.

3. Apparatus according to claim 2 wherein the area of said first piston is larger than the area of said second piston but smaller than the sum of the area of the valve disc and the area of said second piston acted upon when said second means responds.

4. Apparatus according to claim 1 wherein area of said first piston is larger than the area of said second piston but smaller than the sum of the area of the valve disc and the area of said second piston acted upon when said second means responds.

5. Apparatus according to claim 1 wherein said first means for providing steam to said first piston to close said valve is responsive to an additional excess pressure at said inlet above the pressure at which said second means are responsive to vent said first piston thereby permitting said pressure acting upon said valve disc to further open said valve and further including means for limiting the travel of said valve disc and stem to a second intermediate position.

6. Apparatus according to claim 5 wherein said second means for limiting comprise a pawl for engaging a portion of said stem, said pawl adapted for manual disengagement.

7. Apparatus according to claim 5 wherein said first and second means comprise a first and second pressure responsive valves respectively, said first pressure responsive valve adapted to couple the steam from said inlet to said first piston at pressure below said additional excess pressure and to vent said first piston at pressures above said additional excess pressure and said second valve adapted to vent said second piston at pressures below said excess pressure and to couple said inlet to said piston at pressures above said excess pressure.

8. Apparatus according to claim 1 and further including means for connecting a source of compressed air to said first piston and cylinder arrangement for closing said valve.

9. Apparatus according to claim 1 wherein said first piston contains thereon a projection which engages said second piston as said first piston moves said disc from said fully open to said fully closed position to move said second piston from said second to said first end position, said second piston being slidably coupled to said valve stem, whereby, when pressure is supplied to said second piston, said second piston will act upon said projection on said first piston to move said first piston and said stem thereby causing said valve disc to be moved to said first intermediate position.

* * * * *